United States Patent
Zheng

(10) Patent No.: US 9,447,844 B2
(45) Date of Patent: Sep. 20, 2016

(54) CORD CONNECTOR AND CORD CONNECTING METHODS

(71) Applicant: Blu Dot Design & Manufacturing, Inc., Minneapolis, MN (US)

(72) Inventor: Paul Zheng, Fujian (CN)

(73) Assignee: Blu Dot Design & Manufacturing, Inc., Minneapolis, MN (US)

(*) Notice: Subject to any disclaimer, the term of this patent is extended or adjusted under 35 U.S.C. 154(b) by 165 days.

(21) Appl. No.: 13/965,705

(22) Filed: Aug. 13, 2013

(65) Prior Publication Data
US 2015/0048665 A1   Feb. 19, 2015

(51) Int. Cl.
  *F16G 9/02* (2006.01)
  *F16G 11/12* (2006.01)
  *A47C 7/22* (2006.01)
  *A47C 5/00* (2006.01)
  *A47C 5/04* (2006.01)
  *A47C 5/12* (2006.01)
  *A47C 5/02* (2006.01)

(52) U.S. Cl.
  CPC .......... *F16G 11/12* (2013.01); *A47C 5/00* (2013.01); *A47C 5/02* (2013.01); *A47C 5/04* (2013.01); *A47C 5/12* (2013.01); *A47C 7/22* (2013.01); *Y10T 24/3918* (2015.01); *Y10T 29/49954* (2015.01)

(58) Field of Classification Search
  CPC .......... F16G 11/12; A47C 5/02; A47C 5/12; A47C 5/04; A47C 5/00; A47C 7/22; Y10T 29/49181
  See application file for complete search history.

(56) References Cited

U.S. PATENT DOCUMENTS

| | | | |
|---|---|---|---|
| 2,590,049 | A | 3/1952 | Sidlinger |
| D168,212 | S | 11/1952 | Cicchelli |
| 2,649,901 | A | 8/1953 | Johnson |
| D171,265 | S | 1/1954 | Philips |
| 2,684,709 | A | 7/1954 | Schawinsky |
| 2,723,712 | A | 11/1955 | Yellen |
| 2,733,755 | A | 2/1956 | Boucher |
| 2,763,318 | A | 9/1956 | Bertoia |
| D179,376 | S | 12/1956 | Breed |
| D184,202 | S | 12/1958 | Yuen |
| 2,916,744 | A | 12/1959 | May et al. |
| 2,930,430 | A | 3/1960 | Bloom |
| 3,180,685 | A | 4/1965 | Rogalski et al. |
| 3,656,808 | A | 4/1972 | Chang |
| 3,694,030 | A | 9/1972 | Grosfillex |
| D287,909 | S | 1/1987 | Weiss |
| D292,048 | S | 9/1987 | Shaffer |
| 5,246,265 | A | 9/1993 | Nagan et al. |
| 5,338,097 | A | 8/1994 | Tan |
| 5,689,860 | A * | 11/1997 | Matoba ............ F16G 11/00 24/115 F |
| 5,695,253 | A | 12/1997 | Jenkins |
| D427,797 | S | 7/2000 | Tseng |
| D429,303 | S | 8/2000 | Peterson, Jr. |
| 6,134,727 | A | 10/2000 | Hwang |

(Continued)

OTHER PUBLICATIONS

Adverstisement from Target, "Woven Techniques Hard Goods", Interior Design Capsule, made publicly available by at least Feb. 27, 2012.

*Primary Examiner* — Richard Chang
(74) *Attorney, Agent, or Firm* — Fredrikson & Byron, P.A.

(57) ABSTRACT

A cord connector, methods of connecting cords using a cord connector, an article including cord connections and a method of making an article with cord connections is provided.

6 Claims, 10 Drawing Sheets

(56) References Cited

U.S. PATENT DOCUMENTS

| | | |
|---|---|---|
| 6,332,646 B1 | 12/2001 | Tseng |
| 6,364,410 B1 | 4/2002 | Tang |
| 6,447,057 B1 | 9/2002 | Chen |
| 6,554,717 B2 | 4/2003 | Cho |
| D475,860 S | 6/2003 | Yang |
| 6,702,371 B2 | 3/2004 | Zheng |
| 6,752,452 B2 | 6/2004 | Choi et al. |
| 6,824,207 B1 | 11/2004 | Lin |
| D499,258 S | 12/2004 | Tseng |
| 6,840,573 B1 | 1/2005 | Yao |
| 6,848,740 B1 | 2/2005 | Reese |
| D503,289 S | 3/2005 | Eyman et al. |
| 6,877,814 B2 | 4/2005 | Lin |
| 6,883,862 B1 | 4/2005 | Yao |
| D507,121 S | 7/2005 | Eyman |
| D507,616 S | 7/2005 | Simpson |
| D507,891 S | 8/2005 | Eyman et al. |
| 6,938,951 B1 | 9/2005 | Tseng |
| 6,939,241 B1 | 9/2005 | Chang |
| 6,957,852 B1 | 10/2005 | Hsieh |
| 6,971,712 B1 | 12/2005 | Tseng |
| 7,000,983 B1 | 2/2006 | Tsai |
| D516,330 S | 3/2006 | Ruiter |
| 7,011,372 B1 | 3/2006 | Hsieh |
| 7,144,078 B2 | 12/2006 | Hsieh |
| 7,178,864 B2 | 2/2007 | Hsieh |
| 7,264,245 B2 | 9/2007 | Cho |
| D554,873 S | 11/2007 | Ma |
| D555,378 S | 11/2007 | Tsai |
| 7,311,617 B2 | 12/2007 | Langhorn |
| D565,310 S | 4/2008 | Marin et al. |
| D571,572 S | 6/2008 | Tseng |
| 7,401,785 B1 | 7/2008 | Waite |
| 7,404,601 B2 | 7/2008 | Cheng |
| 7,540,259 B2 | 6/2009 | Pape et al. |
| D608,104 S | 1/2010 | Vonnegut |
| 7,648,421 B2 | 1/2010 | Yoon |
| 7,727,131 B2 * | 6/2010 | Longo ........................... 482/124 |
| 7,878,585 B2 | 2/2011 | Salisbury |
| D637,828 S | 5/2011 | Horn et al. |
| 7,938,489 B2 | 5/2011 | Nazari |
| 7,967,374 B2 | 6/2011 | Akkad |
| D649,800 S | 12/2011 | Lievore et al. |
| D656,326 S | 3/2012 | Soewondo |
| D661,360 S | 6/2012 | Campanaro et al. |
| 8,282,509 B1 | 10/2012 | Michaelson et al. |
| D677,920 S | 3/2013 | Christakos |
| D681,970 S | 5/2013 | Christakos |
| D683,156 S | 5/2013 | Christakos |
| D688,057 S | 8/2013 | Christakos |
| D691,384 S | 10/2013 | Akkad |
| 8,544,420 B2 * | 10/2013 | Leon ..................... A01K 1/04 119/771 |
| D701,703 S | 4/2014 | Aiello |
| D703,460 S | 4/2014 | Kreuzer et al. |
| 2001/0009871 A1 | 7/2001 | Cho |
| 2002/0145326 A1 | 10/2002 | Liu |
| 2002/0183128 A1 | 12/2002 | Cho |
| 2003/0008721 A1 | 1/2003 | Macaluso |
| 2003/0060309 A1 | 3/2003 | Smith |
| 2003/0078111 A1 | 4/2003 | Wenzler |
| 2003/0168900 A1 | 9/2003 | Poli |
| 2003/0234561 A1 | 12/2003 | Zheng |
| 2004/0034929 A1 | 2/2004 | Hwang |
| 2004/0245810 A1 | 12/2004 | Tseng |
| 2005/0088018 A1 | 4/2005 | Yao |
| 2006/0232108 A1 | 10/2006 | Hsieh |
| 2006/0249991 A1 | 11/2006 | Hsieh |
| 2007/0052178 A1 | 3/2007 | Cottrell |
| 2007/0063550 A1 | 3/2007 | Lin |
| 2007/0187897 A1 | 8/2007 | Dilling |
| 2007/0187998 A1 | 8/2007 | Chen |
| 2010/0164256 A1 | 7/2010 | Salisbury |
| 2011/0043003 A1 | 2/2011 | Akkad |
| 2011/0126429 A1 * | 6/2011 | Houston ........................ 36/136 |

* cited by examiner

CORD CONNECTOR AND CORD CONNECTING METHODS

FIELD OF THE INVENTION

The present invention generally relates to a cord connector and cord connecting methods that can be used for connecting two cord ends.

BACKGROUND OF THE INVENTION

Elastic cords such as bungee cords are utility items that can be used for securing objects. Elastic cords are typically used to tie objects of varied sizes and shapes to a support surface. Elastic cords can also be used to provide ergonomic support for furniture such as chairs or footrests. In these uses the elastic cords form a weave or pattern, which is created by looping cords around a frame and then securing the ends of the cords together by tying the ends into a knot.

The ends of the bungee cord typically overlap when a knot is made, creating a bump having a width larger than the width of the cord. The bump can result in ergonomic discomfort and poor support. Also, tying knots is a time consuming and may result in inconsistent connections.

It would be desirable to provide a simple, fast and consistent method of fastening the ends of cords that result in a less bumpy connection.

SUMMARY

The present invention provides a cord connector and cord connecting methods that can be used for connecting two cord ends. The present invention also provides an article, such as a furniture article that includes cord connections with cord ends connected by a cord connector. Finally, the invention provides methods of manufacturing a furniture article that includes cord connections. As used herein, the term "cord" refers broadly to any type of cord such as an elastic cord, a bungee cord, a rope and the like. The cord can have any desirable cross-section shape and can be made of any desirable material. Likewise, the cord can be fabricated by weaving many strands of nylon, polypropylene, or natural fibers to form a cord.

BRIEF DESCRIPTION OF THE DRAWINGS

The following drawings are illustrative of particular embodiments of the invention and therefore do not limit the scope of the invention. The drawings are not necessarily to scale (unless so stated) and are intended for use in conjunction with the explanations in the following detailed description. Embodiments of the invention will hereinafter be described in conjunction with the appended drawings, wherein like numerals denote like elements.

DETAILED DESCRIPTION

Figure 3:
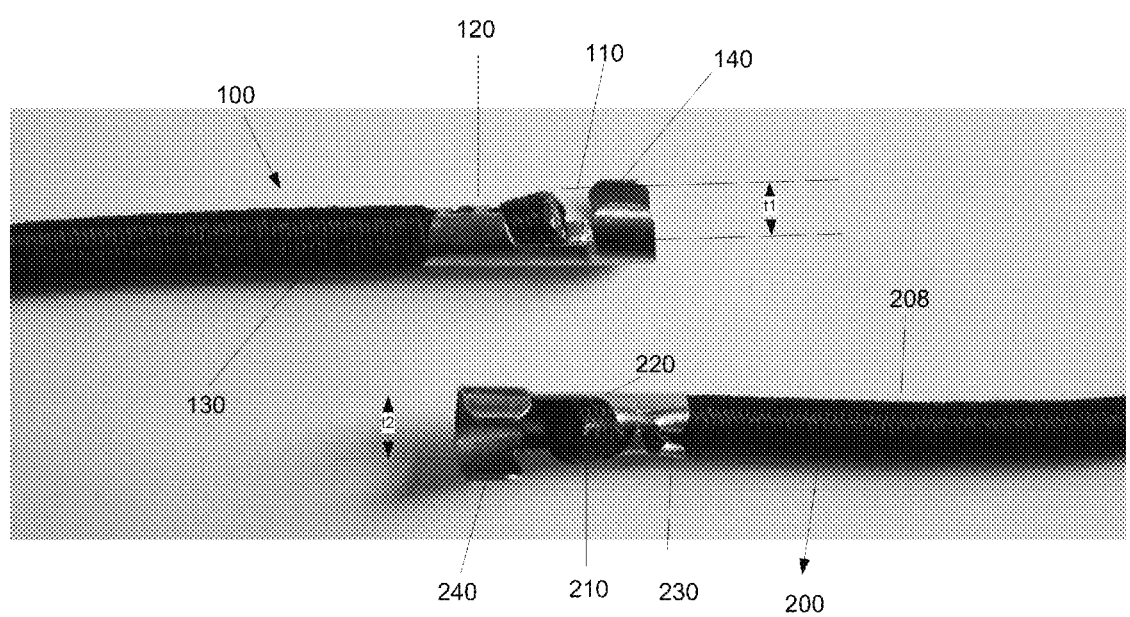
FIG. 3 an upper perspective view of two cords and connector assemblies with pressure applied on proximal ends of the connector.
Figure 7:
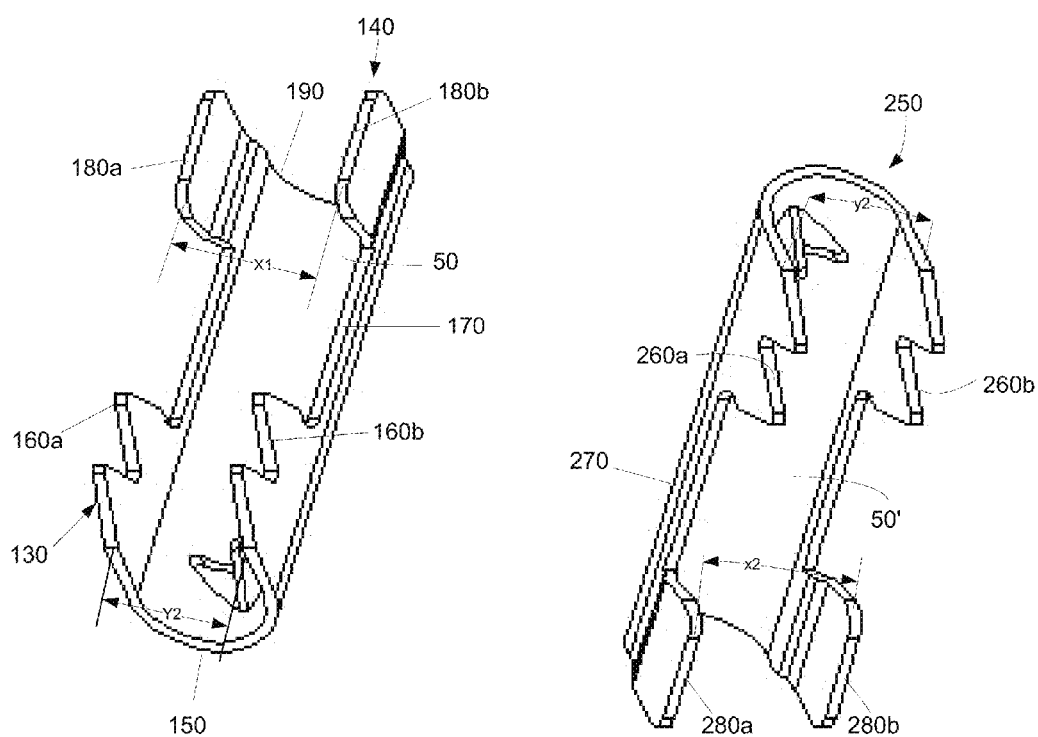
FIG. 7 is an upper perspective view of two cord connectors according to some embodiments of the invention.

The invention includes a cord connector. The cord connector is best illustrated in FIGS. 3 and 7, which illustrate a first cord connector 120 and a second cord connector 220. The cord connectors 120 and 220 are the same according to certain embodiments. In some cases, the cord connector is a universal cord connector that can be connected to another universal cord connector.

The cord connector will now be described with reference to the first cord connector 120. The first cord connector 120 includes a base 50 having a proximal end 130 and a distal end 140. The base 50 also defines peripheral edges 150, 170, 190 forming a non-continuous perimeter. The base 50 can have any desired shape and is illustrated as having a generally rectangular shape. The cord connector 120 further includes a proximal flared portion 160 on the proximal end 130 and a distal flared portion 180 on the distal end 140. The proximal flared portion 160 and distal flared portion 180 generally extend outward from the base 50.

The proximal flared portion 160 can have a first flare 160a and a second flare 160b.

Likewise, the distal flared portion 180 can have a first flare 180a and a second flare 180b. The flares 160a, 160b and 180a, 180b can have any desired shape. In the illustrated embodiment, the flares 160a, 160b each have a saw tooth shape the flares 180a, 180b each have a generally rectangular shape. The flares 160a, 160b and 180a, 180b comprise a resilient material so they can bend towards one another and/or bend inward towards the base 50 to clamp upon a cord that is placed in between them.

The cord connector 120 also has a distal end 140 with a distal end width "x1" before clamping pressure is applied. Likewise, the cord connector 120 has a proximal end 130 with a proximal end width "y1" before clamping pressure is applied. In some cases the distal end width "x1" is a width between the two flares 180a, 180b before they are bent and the proximal end width "y1" is a width between the two flares 160a, 160b before they are bent. The proximal end width "y1" decreases when pressure is applied to the two flares 160a, 160b and the distal end with "x1" decreases when bending pressure is applied to the two flares 180a, 180b. When bending pressure is applied to the flares 160a, 160b, they bend such that the peripheral edge 150 defines a generally continuous perimeter. Likewise, when bending pressure is applied to the flares 180a, 180b, they bend such that the peripheral edge 190 also defines a generally continuous perimeter.

The cord connector 120 can be made of any desired material such that the flared portions 160, 180 comprise a resilient material that bends or otherwise deform upon applying pressure. One suitable resilient metal includes aluminum. In some cases, the entire cord connector 120 comprises a single resilient material. In other cases, part of the cord connector comprises one material whereas another part comprises another material.

The second cord connector 220 has the same features as the first cord connector 120 and includes a base 50' having a proximal end 230 and a distal end 240. The base 250 also defines peripheral edges 250, 270, 290 forming a non-continuous perimeter. The cord connector 120 further includes a proximal flared portion 260 with flares 260a, 260b on the proximal end 230 and a distal flared portion 280 with flares 280a, 280b on the distal end 240. The distal end 240 has a distal end width "x2" and the proximal end 230 has a proximal end width "y2" before clamping pressure is applied.

The invention also includes a method of connecting two cord ends with a cord connector. FIGS. 1-6 illustrates a method of connecting two cords ends according to certain embodiments. The method can be used to connect two different cords, or to form a loop in a single cord.

Figure 1:
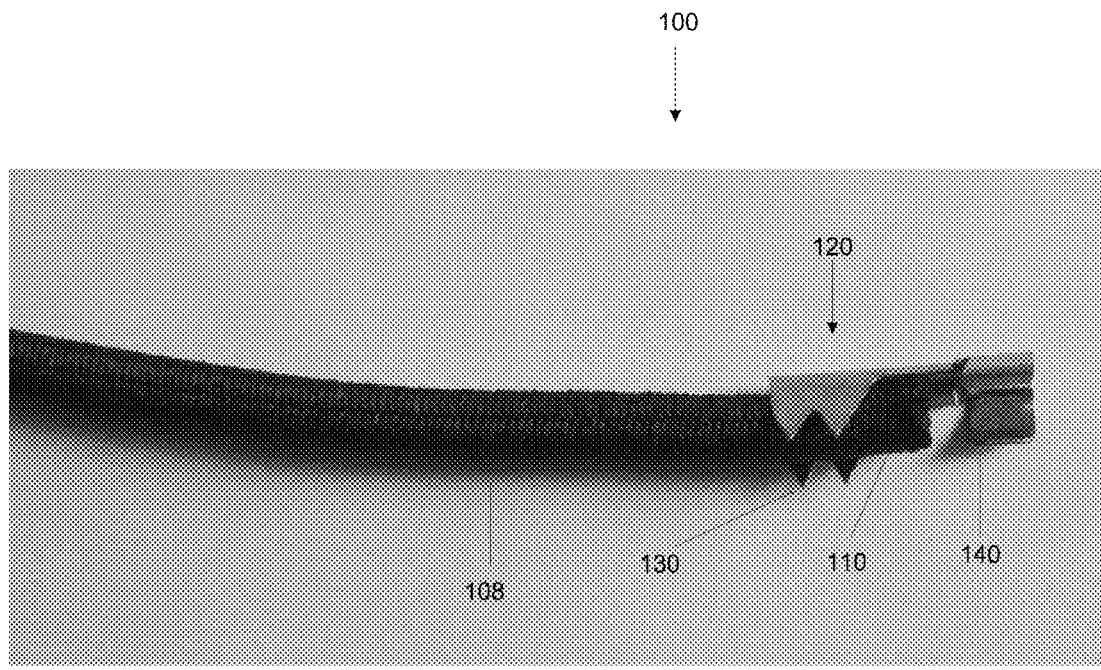
FIG. 1 is an upper perspective view of a cord and a connector assembly according to some embodiments of the invention.
Figure 2:
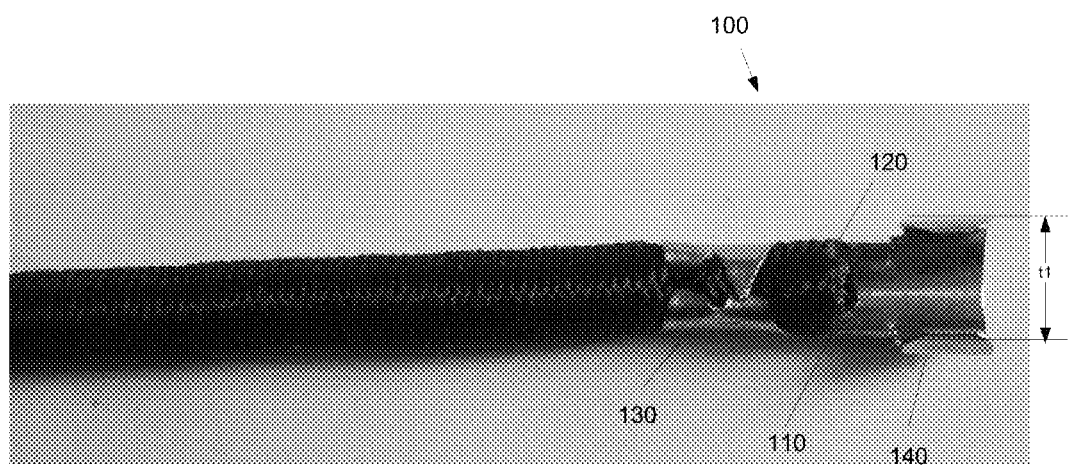
FIG. 2 is an upper perspective view of the cord and connector assembly of FIG. 1 with pressure applied on a proximal end of the connector.

The method includes providing a first cord 108 having a first cord end 110 and providing a first cord connector 120. The first cord end 110 is generally a terminal end of a first cord 108. The first cord connector 120 can have the features described above. The method includes positioning or aligning the first cord end 110 with the first cord connector 120 such that the first cord end 110 lies along the base 50 and in between the proximal flared portion 160. The method also includes applying pressure to the first cord connector 120 to engage the first cord connector 120 with the first cord end 110. In certain cases, one applies pressure to the flares 160a, 160b of the proximal flared portion 160 to bend the flares inwardly and towards the first cord end 110. Pressure can be applied manually by using a tool such as pliers, crimp tool and the like or by an automated process involving a machine applying pressure. As best seen in FIG. 2, as pressure is applied, the flares 160a, 160b engage with the first cord end 110 and with one another. The saw-tooth shape of the flares 160a, 160b also helps the flares dig in and attach to the first cord end 110.

As shown in FIG. 3, the method further includes providing a second cord 208 having a second cord end 210 and providing a second cord connector 220. The second cord connector 220 can have the features described above for the second cord connector 120. In some cases, the first cord connector 120 and the second cord connector 220 are the same. The second cord end 210 can be a terminal end of a second cord 208. The second cord end 210 can also be a terminal end of the first cord 108 to form a loop with the first cord 108.

The method further includes positioning or aligning the second cord connector 220 with the second cord end 210 such that the second cord end 210 lies along the base 50' and in between the proximal flared portion 260. The method also includes applying pressure to the second cord connector 220 to engage the second cord connector 220 with the second cord end 210. In certain cases, one applies pressure to the flares 260a, 160b of the proximal flared portion 260 to bend the flares inwardly and towards the second cord end 210. Pressure can be applied manually by using a tool such as pliers, crimp tool and the like or by an automated process involving a machine applying pressure. As best seen in FIG. 3, as pressure is applied, the flares 260a, 260b engage with the second cord end 210 and with one another. The saw-tooth shape of the flares 260a, 260b also helps the flares dig in and attach to the second cord end 210.

The first cord end 110 has a first cord diameter "t1" and the second cord end 210 has a second cord diameter "t2". The cord diameters "t1", "t2" are typically less than the proximal end widths "y1", "y2" before pressure is applied to the flare portions 160, 260.

Figure 4:
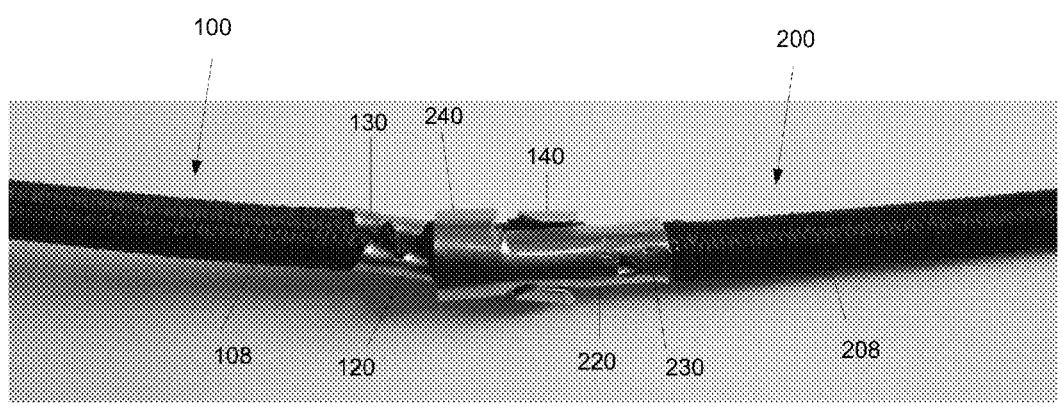
FIG. 4 is an upper perspective view of two cords and connectors of FIG. 3 in engagement with each other.

After the first cord connector 120 is attached to the first cord end 110 and the second cord connector 220 is attached to the second cord end 210, the method further includes attaching the first cord connector 120 to the second cord connector 220, as shown in FIG. 4. In certain embodiments, the method includes placing the first cord connector 120 on top of the second cord connector 220 (or placing the second cord connector 220 on top of the first cord connector 120).

Figure 5:
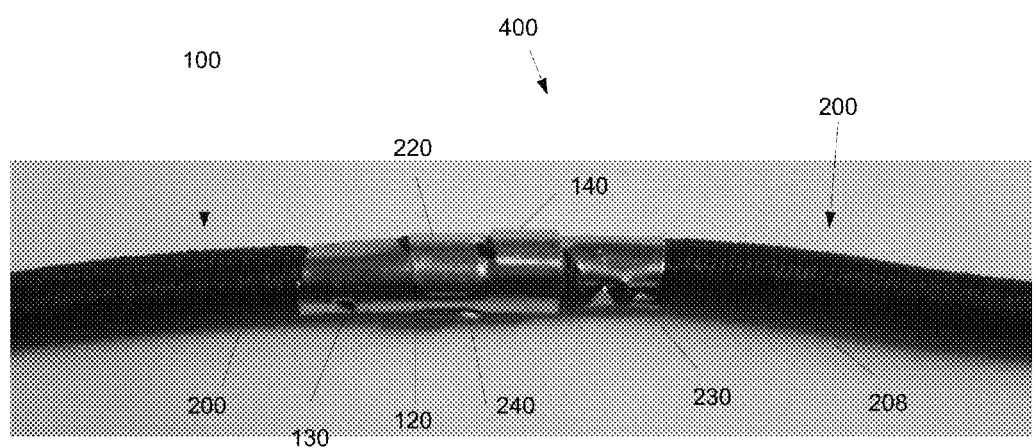
FIG. 5 an upper perspective view of two cords and connectors of FIG. 4 in engagement with each other with pressure applied on distal ends of the connectors.

The method next includes applying pressure to the cord connectors 120, 220 to engage them with each other, as shown in FIG. 5. Generally one applies pressure to the first cord connector 120 to engage the first cord connector 120 with the second cord connector 220 and applies pressure to the second cord connector 220 to engage the second cord connector 220 with the first cord connector 120. In certain cases, the method includes applying pressure to the flares 140a, 140b of the distal flared portion 140 to bend the flares 140a, 140b inwardly and to clamp them around the base 50' of the second cord connector 220. Likewise, the method includes applying pressure to the distal flares 240a, 240b of the distal flared portion 240 to bend the flares 240a, 240b inwardly and to clamp them around the base 50 of the first cord connector 120. Pressure is applied manually or automatically.

After pressure has been applied, the cord connectors 120, 220 are engaged with each other in a clamping engagement as shown in FIG. 5 to form a cord connection 400. In this cord connection 400, the flared portions 160, 260 are clamped such that the peripheral edges 150, 250 define a generally continuous perimeter. The peripheral edges 150, 250 need not form a closed connection (e.g., circle or square ends). It is sufficient that the peripheral edges 150, 250 close around the perimeter of the cord ends 110, 210 for adequate clamping. The proximal end widths "y1", "y2" and the distal end widths "x1", "x2" of the first and second cord connectors 120, 220 may decrease when pressure is applied on the first and second cord connectors 120, 220 to provide adequate clamping force.

Figure 6:
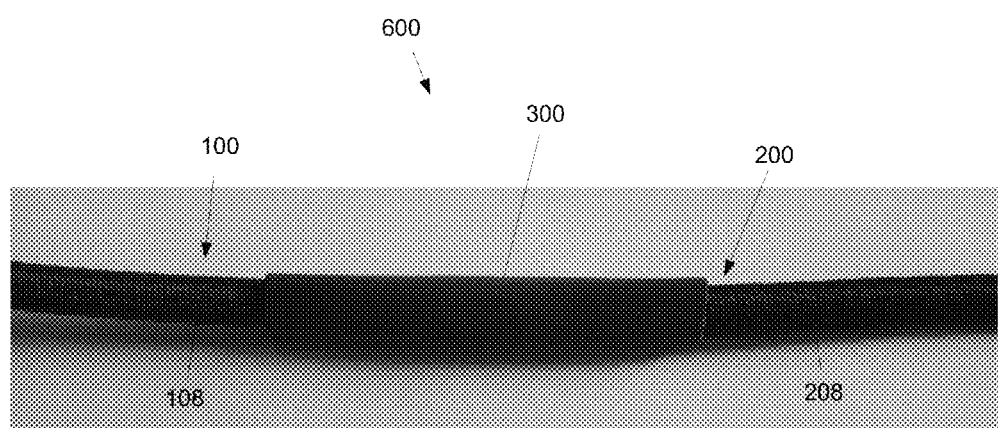
FIG. 6 is an upper perspective view of cord connector assemblies according to some embodiments of the invention.

The method further includes covering the cord connection 400 with a cover 300, as shown in FIG. 6. The cover 300 can be made of any desired material and in some cases includes a polymeric material such as polypropylene, nylon, silicone, latex or neoprene. Also, the cover 300 can be provided in a pre-formed tubular shape or can be provided in another form, such as a sheet form, that is then wrapped around the cord connection 400. In some cases, the cover 300 can be formed by taking a sheet and wrapping the sheet around the cord connection 400. The sheet can be secured in a wrap configuration using any known method. In some cases, heat and/or pressure can be applied to the sheet to shrink secure it around the cord connection 400. In other cases, an adhesive can be applied to the sheet to adhere it to the cord connection 400

Once the cord connection 400 is covered with a sheet, it forms a covered cord connection 600 that is less bulky and bumpy than a tied knot. In fact, the covered cord connection 600 has a largest diameter that is not more than 25% (or 20% or 15% or 10%) larger than the diameter of either the first cord diameter "t1" or the second cord diameter "t2".

Figure 8:
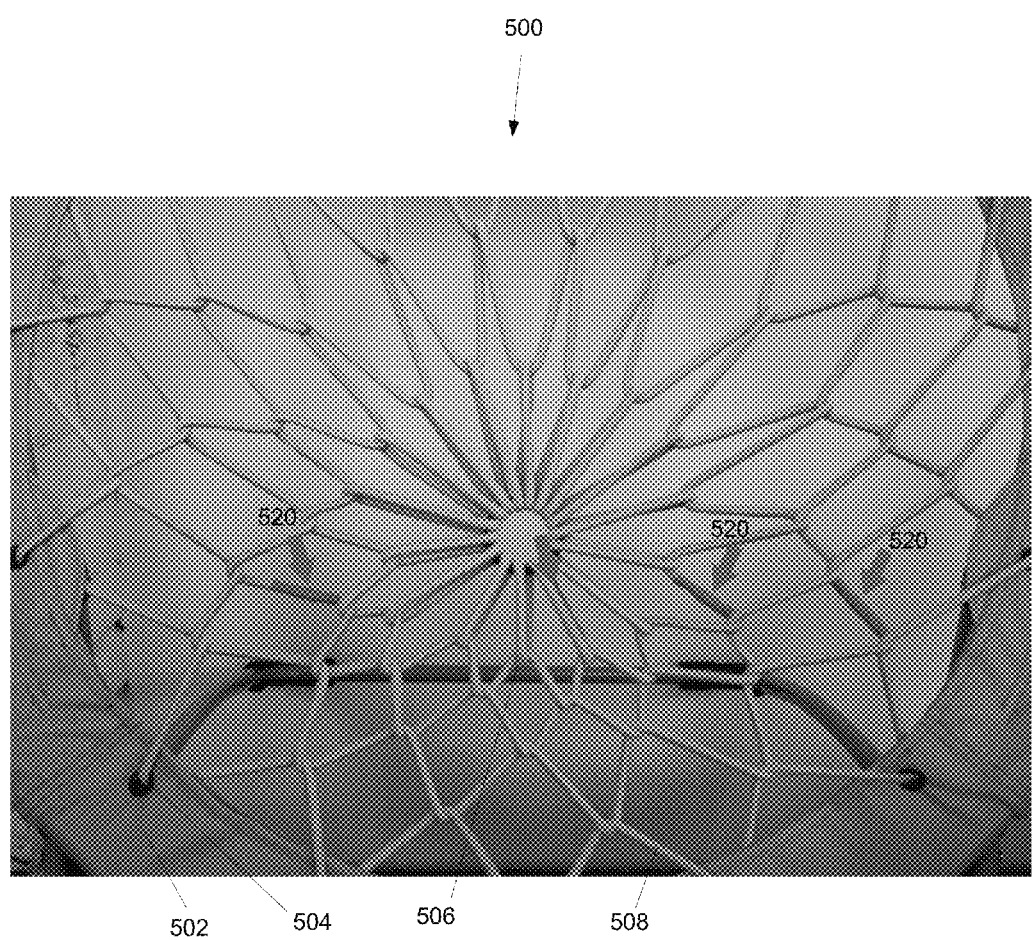
FIG. 8 is an upper perspective view of a portion of a chair with cord connectors according to some embodiments of the invention.
Figure 9:
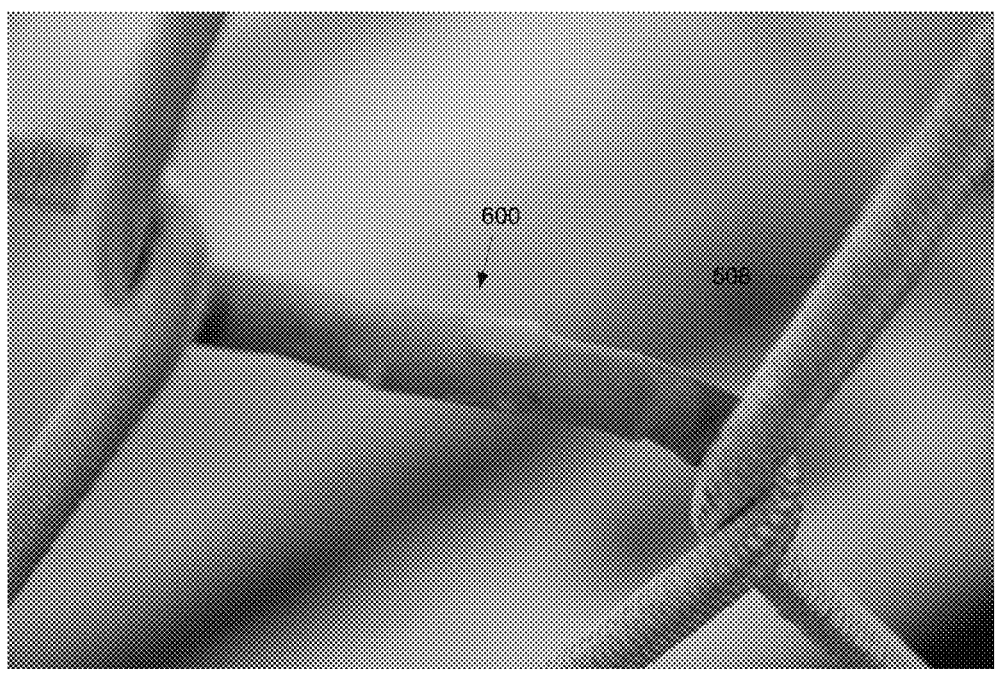
FIG. 9 is an upper perspective view of a portion of the chair of FIG. 9 with details of the cord connections shown in detail.
Figure 10:
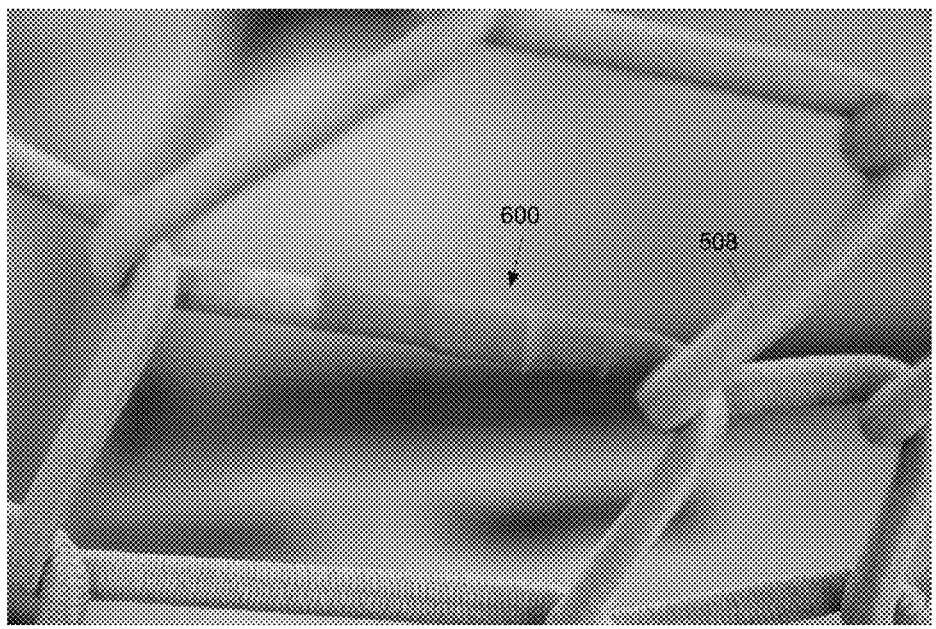
FIG. 10 another upper perspective view of a portion of the chair of FIG. 9 with details of the cord connections shown in detail.

The invention also provides an article that includes cord ends connected by a cord connector. In some cases, the article is a furniture article. The furniture article can also be a chair. FIGS. 8-10 show portions of a chair 500 according to certain embodiments. The chair 500 includes a frame 502 and a cord 508. The cord 508 can be a plurality of cords. The frame 502 can comprise any desired material, and in some cases can be a metal such as steel or aluminum or a rigid polymer such as PVC. The frame 502 can also have any desired shape. Including but not limited to a rectangle, a circle, a square, a triangle or an oval. In the illustrated embodiment shown in FIGS. 8-10, the frame 502 is shaped as a circle.

The chair 500 can also include one or more support posts 506 operably coupled to the frame 502. The support posts 506 rest on a floor and can be similar in design to legs of a chair. The support posts 506 can also be made of any desired material that can support the weight of a user when the user sits in the chair 500. In some cases, the support posts 506 are made of the same material as the frame 502 and in other cases the support posts 506 are made of a different material as the frame 502. Suitable materials include but are not limited to a metal such as steel or aluminum or a rigid polymer such as PVC. The support posts 506 can also have any desired cross-sectional shape such as a cylindrical shape or a rod shape.

The chair 500 includes a cord 508 having a cord terminal end. The cord 508 can be made of any desired cord material. In some cases, the cord 508 is an elastomeric cord made of an elastomeric material such as nylon, polypropylene or natural fibers. In certain cases, the cord 508 can be a commercially available bungee cord.

The cord 508 is attached to the frame 502 using any desired attachment method. In some cases, the cord 508 is connected to the frame 502 simply by being looped around a portion of the frame 502. In some cases, the cord 508 is looped around portions of the frame 502 to form plurality of loops 512. In certain cases, the chair 500 can include a plurality of holes 504 placed on the frame 502, e.g., circumferentially around the frame 502 and the plurality of the loops 512 are formed by allowing the cord 508 to pass through the holes 504. The holes 502 can have any desired shape and are shown having a circular shape.

The cord 508 has a terminal end that attaches to either a terminal end of the same cord or a terminal end of a second cord using a cord connection. The cord connection is preferably a cord connection as described above. Generally, the cord connection includes a first cord connector and a second cord connector, wherein the first cord connector is secured to the first cord terminal end and the second cord connector is secured to the second cord terminal end, wherein the first cord connector is secured to the second cord connector. The furniture article can include a plurality of cords having one or more terminal ends connected to other terminal ends using cord connections.

The invention further provides a method of manufacturing a furniture article that includes cord connection methods. The method includes providing a frame 502 and providing plurality of cords 508 that have terminal ends secured to a cord connector according to any of the embodiments described above. The method further includes looping the cords 508 around the frame 502 or through holes 504 in a frame 502 and positioning a cord connector at a cord terminal end on top of or beneath another cord connector at another cord terminal end. The cord terminal ends can be part of two different cords or they can instead be terminal ends of the same cord. The method next includes applying pressure to the cord connectors to engage them with each other. Further, the method includes covering the cord connection 400 with a cover 300.

In the foregoing detailed description, the invention has been described with reference to specific embodiments. However, it may be appreciated that various modifications and changes can be made without departing from the scope of the invention.

What is claimed is:

1. An article, comprising:
   a frame;
   a cord being secured to the frame, wherein the cord comprises a first cord terminal end and a second cord terminal end; and
   a cord connection comprising a first cord connector and a second cord connector, wherein the first cord connector is secured to the first cord terminal end and the second cord connector is secured to the second cord terminal end, the second cord terminal end overlapping with the second cord connector over an overlap portion, wherein the first cord connector is secured to the second cord connector, and wherein the first cord connector has a distal end, wherein the distal end has a distal flared portion and wherein the distal flared portion is crimped around the overlap portion of the second cord connector and the second cord terminal end.

2. The article of claim 1 wherein the cord is secured to the frame by looping around a portion of the frame or looping through a hole on the frame.

3. The article of claim 1 wherein the first cord connector has a proximal end, wherein the proximal end has a proximal flared portion and wherein the proximal flared portion is clamped around the first cord terminal end.

4. The article of claim 1 wherein the first cord terminal has a diameter and wherein the first cord connector has a proximal end that attached to the first cord terminal end, wherein the proximal end has a proximal end width, wherein the diameter is less than the proximal end width.

5. The article of claim 1 wherein the cord connection is a covered cord connection.

6. The article of claim 5 wherein the first cord terminal end has a first cord diameter and the second cord terminal end has a second cord diameter, wherein the covered cord connection has a largest diameter that is not more than 25% larger than the diameter of either the first cord diameter or the second cord diameter.

* * * * *